United States Patent
Park et al.

(10) Patent No.: US 9,372,983 B2
(45) Date of Patent: Jun. 21, 2016

(54) APPARATUS AND METHOD OF CONTROLLING PERMISSION TO APPLICATIONS IN A PORTABLE TERMINAL

(71) Applicant: Samsung Electronics Co., Ltd., Gyeonggi-do (KR)

(72) Inventors: Ju-Ha Park, Gyeonggi-do (KR); Dae-Young Kim, Seoul (KR); Song-Yi Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 13/828,110

(22) Filed: Mar. 14, 2013

(65) Prior Publication Data
US 2013/0247177 A1    Sep. 19, 2013

(30) Foreign Application Priority Data
Mar. 14, 2012  (KR) .................. 10-2012-0026260

(51) Int. Cl.
*G06F 21/44* (2013.01)
*G06F 21/62* (2013.01)

(52) U.S. Cl.
CPC .......... *G06F 21/44* (2013.01); *G06F 21/6281* (2013.01)

(58) Field of Classification Search
CPC ... G06F 21/44; G06F 21/6281; H04L 69/167; H04L 61/2015; H04L 61/2092; H04L 61/6059; H04L 61/1511
USPC ............................................ 726/2–4, 16–21
See application file for complete search history.

(56) References Cited

U.S. PATENT DOCUMENTS

| | | | |
|---|---|---|---|
| 2003/0220097 A1* | 11/2003 | Aono et al. | 455/410 |
| 2005/0041671 A1* | 2/2005 | Ikeda et al. | 370/395.52 |
| 2005/0091535 A1* | 4/2005 | Kavalam et al. | 713/201 |
| 2005/0114625 A1 | 5/2005 | Snyder | |
| 2006/0052135 A1 | 3/2006 | Miyauchi | |
| 2006/0174334 A1 | 8/2006 | Perlin et al. | |
| 2007/0232268 A1* | 10/2007 | Park et al. | 455/411 |
| 2007/0264981 A1 | 11/2007 | Miller | |
| 2009/0150645 A1* | 6/2009 | Ono et al. | 711/209 |
| 2009/0276826 A1 | 11/2009 | Ando | |

(Continued)

FOREIGN PATENT DOCUMENTS

| | | |
|---|---|---|
| CN | 101178757 | 5/2008 |
| CN | 102262751 | 11/2011 |

(Continued)

OTHER PUBLICATIONS

Extended European Search Report dated Jul. 23, 2013 in connection with European Patent Application No. 1315969.5, 6 pages.

(Continued)

*Primary Examiner* — Amir Mehrmanesh

(57) ABSTRACT

An apparatus and method of controlling permission to an application in a portable terminal, the apparatus including a controller for, when requested for an invocation of a specific function provided by a framework during an execution of a specific application, determining whether a permission for the specific function is obtained using the specific application's user ID and process ID, and if the permission for the specific function is determined to be restricted, displaying a first message indicating that the permission is restricted.

17 Claims, 7 Drawing Sheets

(56) References Cited

U.S. PATENT DOCUMENTS

2011/0113484 A1 5/2011 Zeuthen
2012/0254774 A1* 10/2012 Patton ........................ 715/758

FOREIGN PATENT DOCUMENTS

| | | |
|---|---|---|
| EP | 1107623 A2 | 6/2001 |
| EP | 1526454 A2 | 4/2005 |
| JP | 2009-271567 | 11/2009 |
| KR | 10-2010-0093717 | 8/2010 |
| KR | 10-2011-0125698 | 11/2011 |

OTHER PUBLICATIONS

International Search Report dated Jun. 24, 2013 in connection with International Patent Application No. PCT/KR2013/002061, 4 pages.

Written Opinion of the International Searching Authority dated Jun. 24, 2013 in connection with International Patent Application No. PCT/KR2013/002061, 6 pages.

Asaf Shabtai et al., "Securing Android-Powered Mobile Devices Using SELinux", IEEE Security and Privacy, IEEE Computer Society, New York, New York, vol. 8, No. 3, May 1, 2010, pp. 36-44.

Translated Office Action dated Apr. 6, 2016 in connection with Chinese Patent Application No. 201380019959.3, 11 pages.

* cited by examiner

APPARATUS AND METHOD OF CONTROLLING PERMISSION TO APPLICATIONS IN A PORTABLE TERMINAL

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Mar. 14, 2012 and assigned Serial No. 10-2012-0026260, the entire disclosure of which is incorporated herein by reference.

TECHNICAL FIELD OF THE INVENTION

The present invention relates generally to portable terminals, and more particularly, to an apparatus and method of controlling permission to applications in a portable terminal.

BACKGROUND OF THE INVENTION

Portable terminals, such as smart phones, tablets, and the like, provide users with various useful functions via many different applications. With the provision of various functions, these portable terminals can use different forms of information as well as the traditional voice call functionality.

For example, certain applications can invoke and use specific functions provided by a framework of the operation system of the portable terminal. In order to use the specific functions provided by the framework, the applications often need to obtain permission for the specific function.

When a particular application obtains permission for a specific function, the application can keep using the specific function and the user cannot restrict the application permission for the specific function.

A problem arises, however, when the application that has obtained the permission for the specific function might compromise private information by using the specific function without user's recognition.

Therefore, a need for restricting permission rights for the specific function is required.

SUMMARY OF THE INVENTION

To address the above-discussed deficiencies of the prior art, it is a primary object to provide an apparatus and method of controlling permission for a specific function of a framework necessary to execute an application.

The present invention also provides an apparatus and method of determining whether the permission for a specific function is obtained using an application's user ID and process ID.

In accordance with one aspect of the present invention, an apparatus for controlling permission to an application in a portable terminal includes a display, and a controller configured to, when requested for an invocation of a specific function provided by a framework during an execution of a specific application, determine whether a permission for the specific function is obtained using the specific application's user ID and process ID, and when the permission for the specific function is determined to be restricted, display a first message indicating that the permission is restricted.

In accordance with another aspect of the present invention, a method of controlling permission to an application in a portable terminal includes, when requested for an invocation of a specific function provided by a framework during execution of a specific application, determining whether a permission for the specific function is obtained using the specific application's user ID and process ID; and when the permission for the specific function is determined to be restricted, displaying a first message indicating that the permission is restricted.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
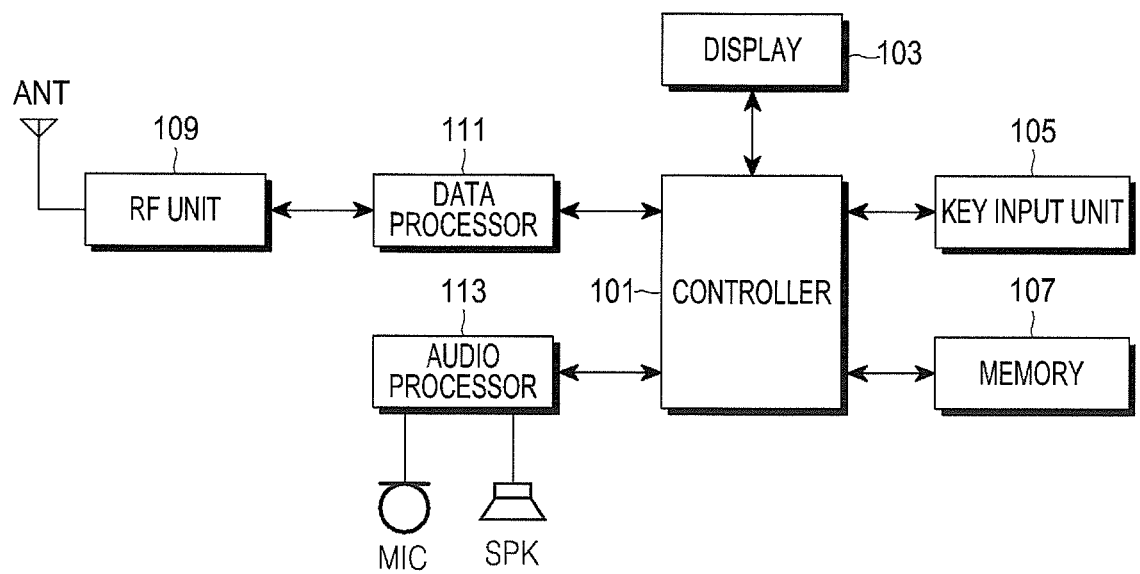
FIG. 1 illustrates an example portable terminal, according to an embodiment of the present invention.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication devices. Reference will now be made in detail to embodiments, examples of which are illustrated in the accompanying drawings, wherein like reference numerals refer to the like elements throughout. Detailed description of well-known functionalities and configurations will be omitted to avoid unnecessarily obscuring the present invention.

The portable terminal according to an embodiment of the present invention is a mobile electronic device that is easily carried by humans, and may include video phones, cellular phones, smart phones, International Mobile Telecommunication-2000 (IM-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Books, portable computers (e.g., laptops, tablet PCs, etc.), or digital cameras.

FIG. 1 illustrates an example portable terminal, according to an embodiment of the present invention.

Referring to FIG. 1, the portable terminal includes a controller 101, a display 103, a key input unit 105, a memory 107, a radio frequency (RF) unit 109, a data processor 111, and an audio processor 113.

The RF unit 109 performs radio communication functionality of the portable terminal. More specifically, the RF unit 109 includes a radio transmitter for performing up conversion on a frequency of a signal to be transmitted and amplifying the signal, and a radio receiver for performing low-noise amplification on a received signal and performing down conversion on a frequency of the received signal. The data processor 111 includes a transmitter for encoding and modulating the signal to be transmitted, and a receiver for demodulating and decoding the received signal. The data processor may include a modem and a CODEC, and the CODEC may have a data CODEC for e.g., packet data processing, or an audio CODEC for e.g., audio signal processing.

The audio processor 113 reproduces a received audio signal output by the data processor 111, through a speaker, or transmits an audio signal generated by a microphone to the data processor 111 for transmission. The key input unit 105 includes keys for entering information of numbers and characters, and function keys for establishing various functionalities, and the display 103 displays image signals onto a screen and displays data requested by the controller 101 to be outputted.

In a case in which the display 103 is a capacitive touch screen display or a resistive touch screen display, the key input unit 105 may only include a minimum number of preset keys while the display 103 may take over some of key input functionalities of the key input unit 105.

The memory 107 includes a program memory and a data memory. Here, the program memory stores a booting system and an operating system (OS) for controlling general operations of the portable terminal, and the data memory stores various data occurred in the operation of the portable terminal. For example, the OS may be an Android® OS.

The memory 107 stores permission restriction information, which includes information regarding permission restricted specific function among a plurality of functions provided by a framework of the OS, to correspond to a specific application's package name. The package name may be a name of the specific application. The permission restriction information is information regarding a specific function for which permission restriction is selected, may include a name and identifier of the specific function.

For example, the memory 107 may store the permission restriction information, as shown in Table 1.

TABLE 1

| Package name | Permission restriction function |
| --- | --- |
| Kakao Talk ® | Personal information |
| Housekeeping log | Network communication |

The personal information may include message data, contact data, and storage data, and the network communication refers to a network communication provided by the portable terminal, such as 3rd Generation Partnership Project (3GPP), Long Term Evolution (LTE), and Wireless Fidelity (WiFi).

Referring to Table 1, it can be seen that the Kakao Talk® application has a restricted permission to use the personal information provided by the framework and the housekeeping log has a restricted permission to use the network communication provided by the framework.

The controller 101 controls one or more operations of the portable terminal.

The controller 101 may restrict or release the restriction on the permission to use a specific function selected by a user from among at least one functions provided by the framework necessary to perform normal operations of a specific application. In a case where a specific application attempts to execute a specific function for which permission is restricted, during an execution of the specific application, the controller 101 indicates that the permission is restricted.

More specifically, with respect to setting up the permission restriction, the controller 101 displays at least one function provided by the framework for the specific application, and then determines whether permission restriction on a specific function among the displayed at least one functions is selected by a user.

If the permission restriction on the specific function is selected, the controller 101 extracts a package name of the specific application, and extracts permission restriction information in which the permission restriction is selected. For example, the package name may be a name of the specific application, and the permission restriction information is information regarding the specific function for which the permission restriction is selected, and may include the name and the identifier of the specific function for which the permission restriction is selected.

The controller 101 stores the extracted permission restriction information to correspond to the extracted package name. In this regard, the controller 101 may store the extracted permission restriction information to correspond to the extracted package name, as shown in Table 1.

For example, when a user requires the permission for the Kakao Talk® application to be displayed, the controller 101 may display permissions to use functions including personal information functions, network communication functions, and hardware control functions.

The personal information function refers to a function that uses information related to personal information of the user of the portable terminal.

For example, the personal information function may include functions that use contact data, messages, and storage. The network communication function refers to a network communication function provided by the portable terminal. For example, the network communication function may include functions to use a 3GPP network, a LTE network, and/or a WiFi network. The hardware control function refers to a function to control hardware included in the portable terminal.

For example, the hardware control function may include functions of photographing of images and videos with a camera (not shown) included in the portable terminal, audio recording with a microphone (not shown) included in the portable terminal, and changing of preferences.

When the permission restriction on the personal information function is selected by a user, the controller 101 may store the permission restriction information that represents the permission for the personal information function is restricted, to correspond to the Kakao Talk® application, in order to indicate that the permission for the personal information function is restricted in the Kakao Talk® application.

Describing the indication of the permission restriction in detail, since the specific application has been executed, the controller 101 determines whether an invocation for a specific function provided by the framework is requested.

If the invocation for the specific function is requested, the controller 101 determines whether permission for the specific function is obtained using the specific application's user ID (UID) and process ID (PID). The UID refers to an ID uniquely assigned to the specific application when the specific application is installed in the portable terminal; and the PID refers to an ID uniquely assigned to the specific application when the specific application is executed in the portable terminal.

When the specific function is invoked, the controller 101 identifies the PID and UID for the specific application that invokes the specific function. Then, the controller 101 searches for process information including information about a currently executing process, and then searches for application information about a specific application using the searched process information and the PID. The process information includes a PID list about the currently executing process. The application information includes the application's UID and package name.

The controller 101 identifies the specific application's package name using the application's UID and the application information. In this regard, the controller 101 compares the specific application's UID with a UID included in the application information. If the comparison shows that the specific application's UID and the UID included in the application information are the same, the controller 101 determines that the application information is information about the specific application, or else, that the application information is not for the specific application. When determining that the application information is information about the specific application, the controller 101 identifies the package name from the application information.

The controller 101 identifies permission restriction information that corresponds to the package name from the memory 107, and determines whether the permission for the requested specific function is obtained, taking the confirmed permission restriction information into account.

If the confirmed permission restriction information includes the requested specific function, the controller 101 determines that the requested specific function is permission restricted. Otherwise, if the confirmed permission restriction information does not include the requested specific function, the controller 101 determines that the requested specific function is not permission restricted. When determining that the specific function is not permission restricted, the controller 101 determines whether the specific application's UID has obtained permission to perform at least one function provided by the framework.

If the specific application's UID has not obtained the permission, the controller 101 determines that the UID has no permission. On the contrary, if the specific application's UID has obtained the permission, the controller 101 determines that the UID has permission.

Then, the controller 101 determines whether a specific function is permission restricted by a user, based on the determination on whether the permission is obtained. If the specific function is permission restricted by a user, the controller 101 displays an error message indicating that the specific function is permission restricted.

For example, during an execution of the Kakao Talk® application, when the personal information function is determined to be permission restricted by a user, the controller 101 may display the error message indicating that the personal information function is permission restricted.

On the contrary, if the specific function is not permission restricted by a user, the controller 101 may determine whether the specific application's UID has obtained permission to perform a specific function of the framework based on the result of whether the permission is obtained.

If the specific application's UID has obtained the permission, the controller 101 performs the specific function. For example, during an execution of the Kakao Talk® application, when it is determined that the personal information function is not permission restricted by a user and the UID of the Kakao Talk® application has obtained the permission for the personal information function, the controller 101 may perform the personal information function provided by the framework.

Otherwise, if the specific application's UID has not obtained the permission, the controller 101 displays an error message indicating that the specific application has no permission for the specific function. For example, during an execution of the Kakao Talk® application, when the UID of the Kakao Talk® application is not found to have obtained the permission, the controller 101 may display the error message indicating that the Kakao Talk® application has no permission for the personal information function.

Figure 2:
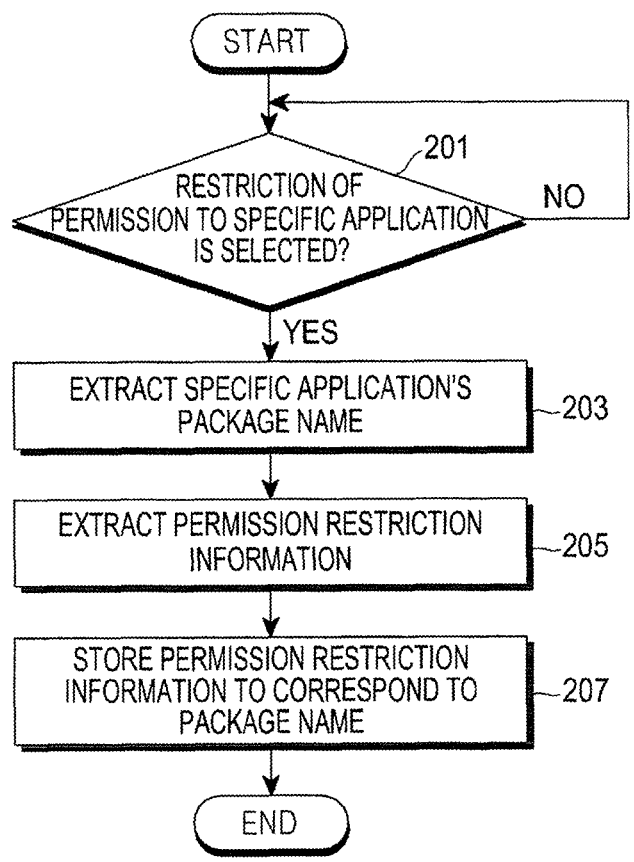
FIG. 2 illustrates an example process for restricting permission for a specific application in the portable terminal, according to an embodiment of the present invention.

FIG. 2 illustrates an example process for controlling permission for a specific application in the portable terminal, according to an embodiment of the present invention.

Referring to FIG. 2, in step 201, the controller 101 displays at least one function provided by a framework of the specific application, and then determines whether permission restriction on a specific function among the displayed at least one functions is selected by a user.

If the permission restriction on the specific function is selected, the controller 101 proceeds to step 203, or otherwise, repeats the step 201.

In step 203, the controller 101 extracts the package name of the specific application, and proceeds to step 205. For example, the package name may be a name of the specific application. In step 205, the controller 101 extracts permission restriction information in which permission restriction is selected, and proceeds to step 207. For example, the permission restriction information is information regarding the specific function for which the permission restriction is selected, and may include a name and identifier of the specific function for which the permission restriction is selected.

In step 207, the controller 101 stores the extracted permission restriction information to correspond to the extracted package name. In this regard, the controller 101 may store the extracted permission restriction information to correspond to the extracted package name, as shown in Table 1.

For example, when the user requires the permission for the Kakao Talk® application to be displayed, the controller 101 may display permissions to use functions including a personal information function, a network communication function, and a hardware control function. When the permission restriction on the personal information function is selected by a user, the controller 101 may store the permission restriction information that represents the permission for the personal information function is restricted, to correspond to the Kakao Talk® application, in order to indicate that the permission for the personal information function is restricted in the Kakao Talk® application.

Figure 3:
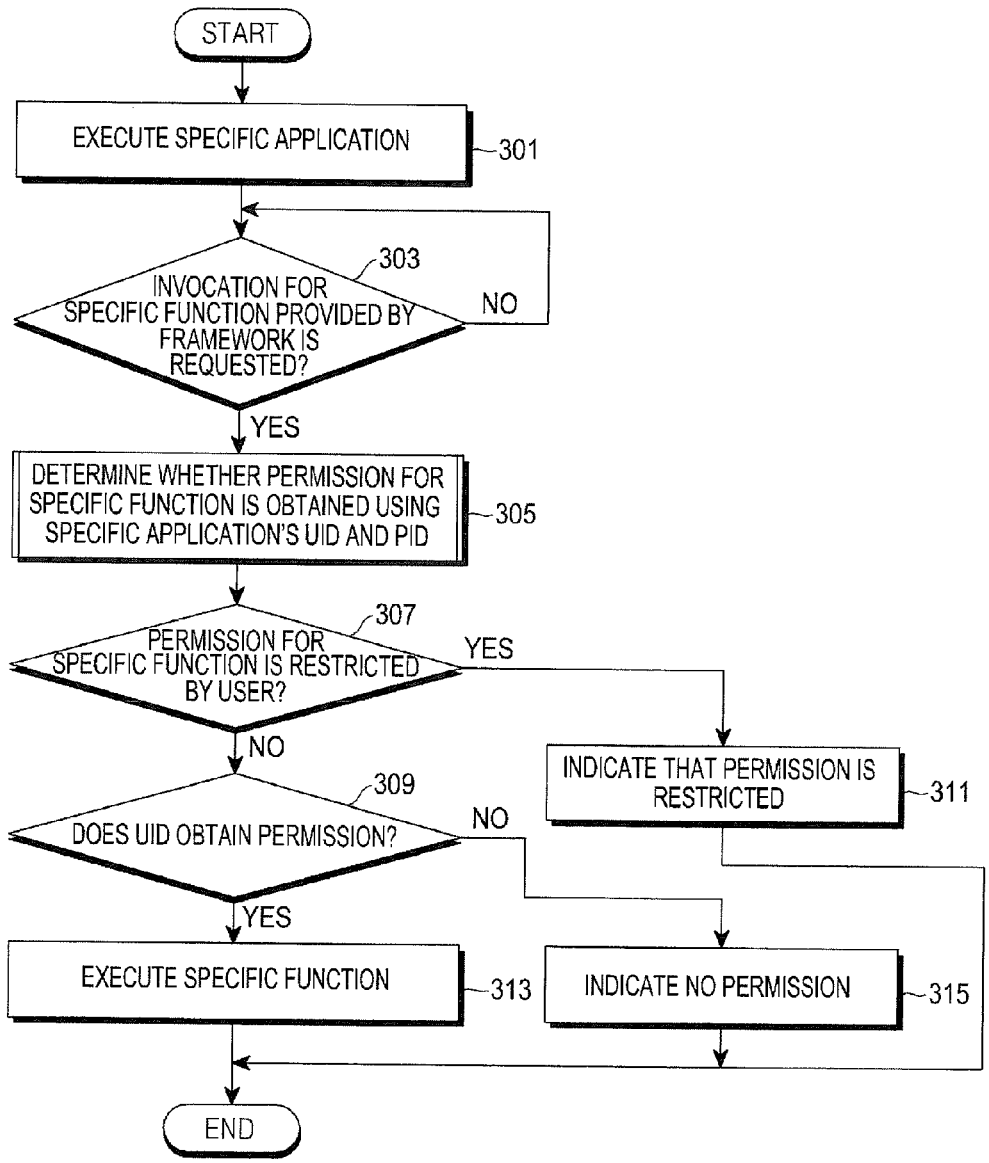
FIG. 3 illustrates an example process for displaying that permission for the specific application is restricted in the portable terminal, according to an embodiment of the present invention.

FIG. 3 illustrates an example process for displaying that permission for the specific application is restricted in the portable terminal, according to an embodiment of the present invention.

Referring to FIG. 3, in step 301, the controller 101 executes a specific application, and proceeds to step 303. In step 303, the controller 101 determines whether a specific function provided by a framework of the specific application is invoked while executing the specific application.

If the specific function is invoked, the controller 101 proceeds to step 305, or otherwise, repeats the step 303.

In step 305, the controller 101 determines whether permission for the specific function is obtained using the specific application's UID and PID, and proceeds to step 307. The UID refers to an ID uniquely assigned to the specific application when the specific application is installed in the portable terminal; and the PID refers to an ID uniquely assigned to the specific application when the specific application is executed in the portable terminal.

Figure 4:
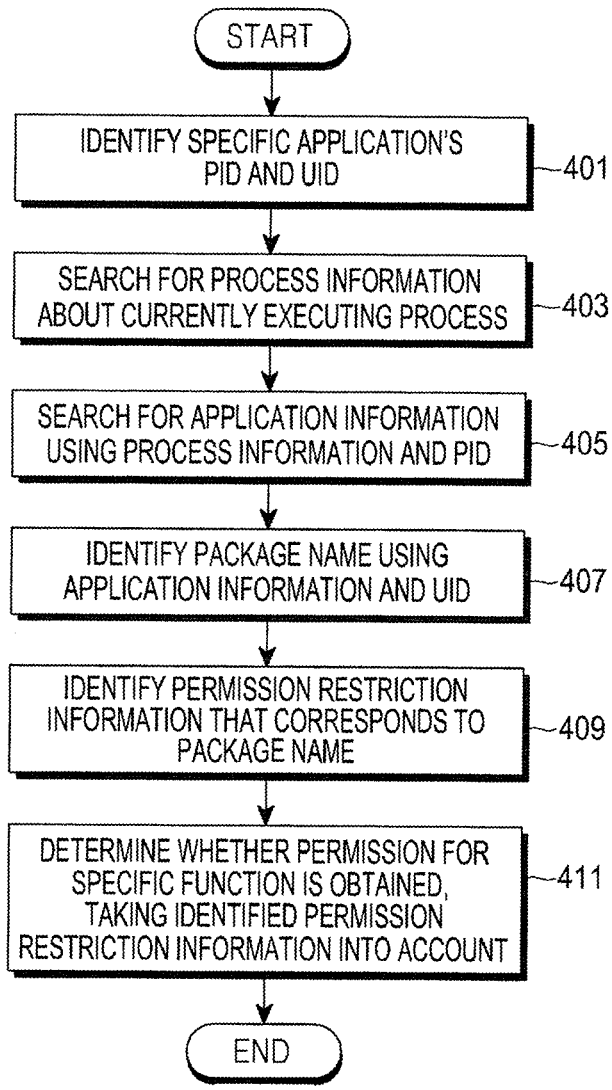
FIG. 4 illustrates an example process for determining whether the permission for the specific application is restricted in the portable terminal, according to an embodiment of the present invention.

FIG. 4 illustrates an example process for determining whether the permission for a specific application is restricted in the portable terminal, according to an embodiment of the present invention. Step 305 will now be described in detail with reference to FIG. 4.

In step 401, when a specific function is invoked, the controller 101 identifies the PID and UID of the specific application that invokes the specific function, and proceeds to step 403. In step 403, the controller 101 searches for process information including information about a currently executing process.

In step 405, the controller 101 searches for application information about the specific application using the searched process information and the PID, and proceeds to step 407. The process information includes a PID list about the currently executing process. The application information includes a UID and package name of the application.

In step 407, the controller 101 identifies the package name of the specific application using the UID of the specific application and the application information, and proceeds to step 409.

In this regard, the controller 101 compares the specific application's UID with a UID included in the application information. If the comparison shows that the UID of the specific application and the UID included in the application information are the same, the controller 101 determines that the application information is information about the specific application, or else, that the application information is not for the specific application. When determining that the application information is information about the specific application, the controller 101 identifies the package name from the application information.

In step 409, the controller 101 identifies from the memory 107, the permission restriction information that corresponds to the package name, and proceeds to step 411. In step 411, the controller 101 determines whether permission for a requested specific function is obtained, taking, the confirmed permission restriction information into account.

If the confirmed permission restriction information includes the requested specific function, the controller 101 determines that the requested specific function is permission restricted by a user. Otherwise, if the confirmed permission restriction information does not include the requested specific function, the controller 101 determines that the requested specific function is not permission restricted. When determining that the specific function is not permission restricted, the controller 101 determines whether the specific application's UID has obtained permission to perform at least one function provided by the framework.

If the UID of the specific application has not obtained the permission, the controller 101 determines that the UID has no permission. On the contrary, if the UID of the specific application has obtained the permission, the controller 101 determines that the UID has the permission.

Referring back to step 307 of FIG. 3, the controller 101 determines whether a specific function is permission restricted by a user, based on the determination of whether the permission is obtained. If the specific function is permission restricted by the user, the controller 101 proceeds to step 311, or else, proceeds to step 309.

In step 311, the controller 101 displays an error message indicating that the specific function is permission restricted. For example, while executing the Kakao Talk® application, when the personal information function is determined to be permission restricted by a user, the controller 101 may display the error message indicating that the personal information function is permission restricted.

In step 309, based on the determination of whether the permission is obtained. the controller 101 may determine whether the UID of the specific application has obtained permission to perform a function of the framework.

If the UID has obtained the permission for the specific application, the controller 101 proceeds to step 313, or else, to step 315.

In step 313, the controller 101 executes the requested specific function.

For example, during an execution of the Kakao Talk® application, if it is determined that the permission for the personal information function is not restricted by a user and the UID of the Kakao Talk® application has obtained the permission for the personal information function, the controller 101 may perform the personal information function provided by the framework.

In step 315, the controller 101 displays an error message indicating that the specific application has no permission for the specific function. For example, during an execution of the Kakao Talk® application, when the UID of the Kakao Talk® application is not determined to have obtained the permission, the controller 101 may display the error message indicating that the Kakao Talk® application has no permission for the personal information function.

Figure 5:
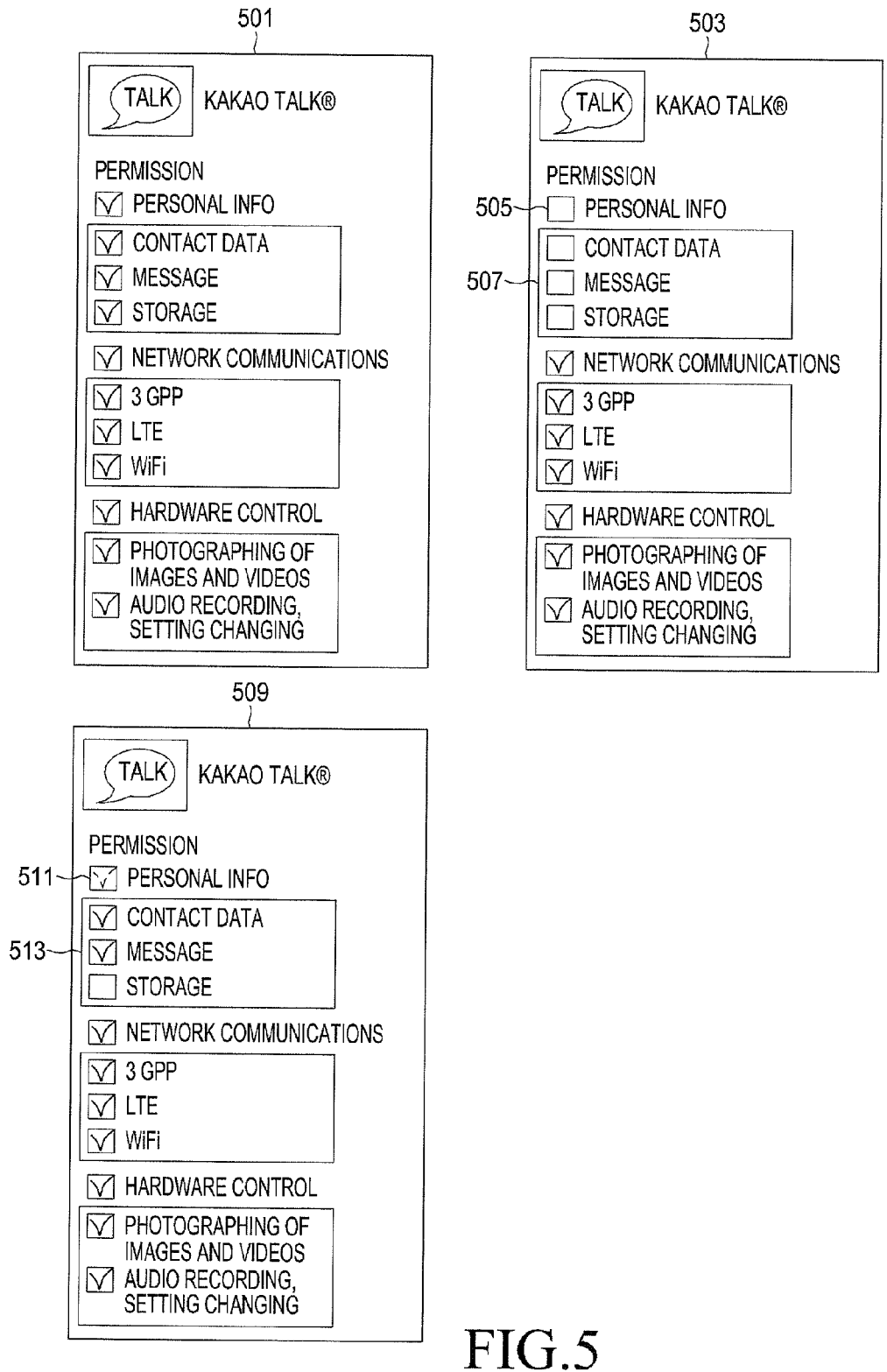
FIG. 5 illustrates example screens to set up restrictions of the permission for the specific application in the portable terminal, according to an embodiment of the present invention.

FIG. 5 illustrates example screens to set up permissions for a specific application in the portable terminal, according to an embodiment of the present invention.

Referring to FIG. 5, screen 501 displays a plurality of permissions for the specific application by grouping them by features.

For example, if the permission for the Kakao Talk® application involves functions to use information, such as contact data, messages, storage, 3GPP, LTE, WiFi, photographing of images and videos, audio recording, and changing preferences, the controller 101 may display personal information permission including permissions for functions to use contact data, messages, and storage, network communications permission including permissions for functions to use 3GPP, LTE, and WiFi, and hardware control permission including permissions for functions to use photographing images and videos, audio recording, and changing preferences, as shown in screen 501.

When a user selects restriction on a representative permission that represents a group from among multiple representative permissions, the controller 101 restricts all the permissions for functions included in the group under the selected representative permission. The controller 101 also indicates that all the permissions included in the selected representative permission are restricted.

For example, when the personal information permission is selected by a user to be restricted in screen 501, the controller 101 may restrict the permissions for the functions to use contact data, messages, and storage included under the personal information permission, and indicate that the personal information permission is restricted (505) and that permissions for the functions to use contact data, messages and storage have been restricted (507).

In this regard, the controller 101 may use a check box that corresponds to the personal information permission indicating whether the personal information permission is restricted or obtained. For example, the controller 101 may indicate that the personal information permission is restricted by leaving the check box blank. For another example, the controller 101 may indicate that the personal information permission is obtained by marking the check box with a specific symbol.

When a permission is selected from among the plurality of permissions in a group, the controller 101 restricts the selected permission and indicates that the selected permission is restricted.

For example, when the permission for the storage function is selected by the user to be restricted in screen 501, the controller 101 may restrict the permission for the storage function, and indicate that the personal information permission is partly restricted (511) and the permission for the storage function is restricted (513).

In this regard, the controller 101 may use the check box that corresponds to the personal information permission to indicate whether the personal information permission is partially restricted. For example, the controller 101 may indicate that the personal information permission is partially restricted by marking the check box with a specific symbol as a dashed line.

The controller 101 may use a check box that corresponds to the personal information permission to indicate whether the permission for the storage function is restricted or obtained. For example, the controller 101 may indicate that the permission for the storage function is restricted by leaving the check box unchecked. For another example, the controller 101 may indicate that the permission for the storage function is obtained by marking the check box with a specific symbol.

Figure 6:
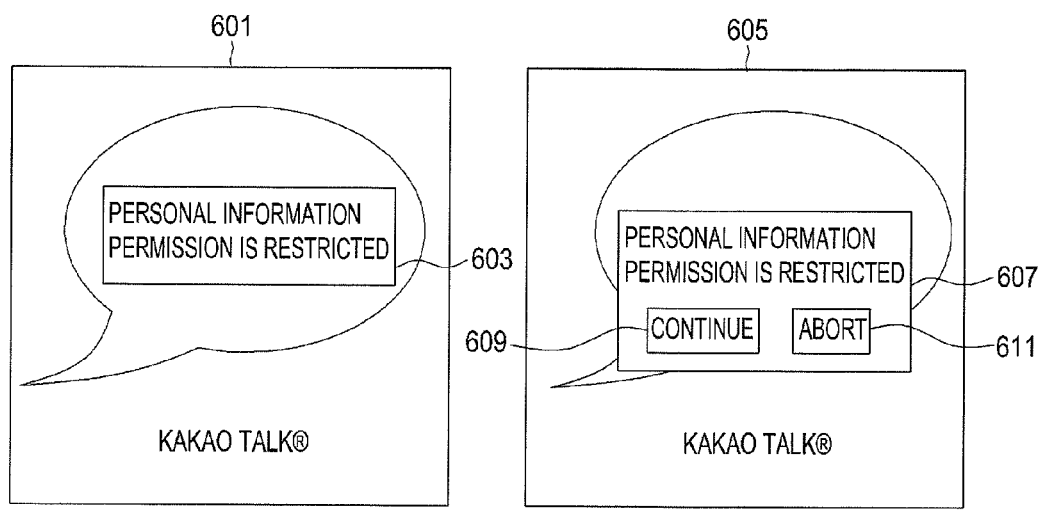
FIG. 6 illustrates example screens indicating that a permission is restricted during an execution of a specific application in the portable terminal, according to an embodiment of the present invention.

FIG. 6 illustrates example screens indicating, that permission is restricted during an execution of a specific application in the portable terminal, according to an embodiment of the present invention.

Referring to FIG. 6, the controller 101 extracts a package name of the specific application when requested for executing the specific application, and then searches for a permission restriction information that corresponds to the extracted package name. If no permission restriction information that corresponds to the extracted package name is searched out, the controller 101 executes the specific application.

Otherwise, if the permission restriction information that corresponds to the extracted package name is searched, the controller 101 uses the searched permission restriction information to determine which function's permission is restricted. The controller 101 indicates that the permission for the identified specific function is restricted, before executing the specific application. The controller 101 may also displays a window asking whether to continue the specific application, together with the message indicating that the permission for the specific function is restricted.

For example, in the case that the personal information permission to the Kakao Talk® application is restricted, the controller 101 may display a pop-up window 603 including a message that "Personal Information Permission is restricted". For another example, in the case that the personal information permission to the Kakao Talk® application is restricted, the controller 101 may display a pop-up window 607 including a window 609 asking whether to continue the specific application and a window 611 asking whether to stop the specific application. If the user selects the window 609, the controller 101 may continue to execute the Kakao Talk® application. Otherwise, if the user selects the window 611, the controller 101 may stop executing the Kakao Talk® application.

Figure 7:
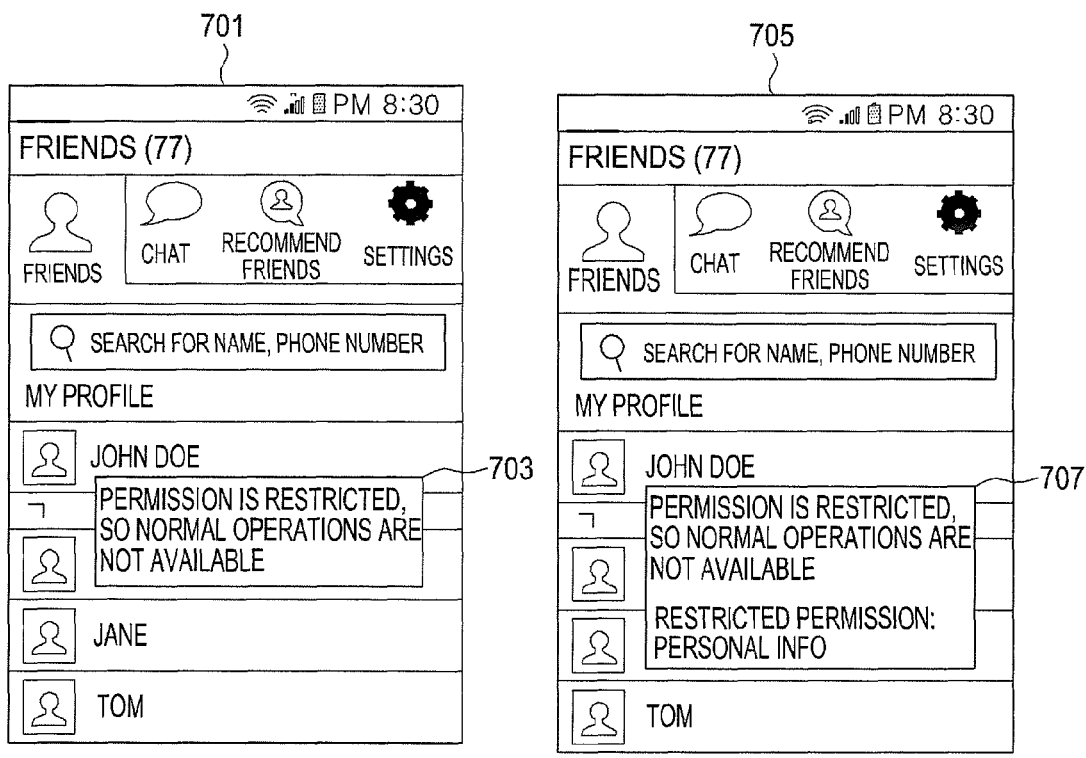
FIG. 7 illustrates example screens for displaying that permission is restricted during an execution of a specific application in the portable terminal, according to another embodiment of the present invention.

FIG. 7 illustrates example screens displaying that permission is restricted during an execution of a specific application, according to another embodiment of the present invention.

Referring to FIG. 7, when a function for which permission is restricted is requested to be used during an execution of a specific application, the controller 101 displays an error message indicating that the permission is restricted. The controller 101 may display the error message indicating which function's permission is restricted.

For example, when the personal information permission to the Kakao Talk® application is restricted and a function related to the personal information is attempted to be used while the Kakao Talk® application is being executed, a pop-up window 703 having a message that "Permission is Restricted, so Normal Operations are not Available" may be displayed, as in screen 701.

As another example, when the personal information permission to the Kakao Talk® application is restricted and the function related to the personal information is attempted to be used while the Kakao Talk® application is being executed, the pop-up window 707 having a message that "Permission is Restricted, so Normal operations are not Available. Restricted permission: Personal Information" may be displayed, as in screen 707.

As such, the present invention has a benefit of controlling permission for a specific function of a framework necessary to execute an application. The present invention also has a benefit of informing users that permission for a specific function is restricted, by determining whether the permission for the specific function is obtained using the application's user ID and process ID.

Several embodiments have been described in connection with e.g., portable terminals, but it will be understood that various modifications can be made without departing the scope of the present invention. Thus, it will be apparent to those ordinary skilled in the art that the invention is not limited to the embodiments described, but can encompass not only the appended claims but the equivalents.

What is claimed is:

1. An apparatus configured to control an application, the apparatus comprising:
a display; and a controller configured to:
when requested for an invocation of a first function provided by a framework of an operating system during an execution of a first application, identify restriction information for at least one function restricted for the first application using a user ID and process ID (PID) of the first application, determine whether the first function is permitted for the first application based on the identified restriction information, wherein the user ID is assigned to the first application when the first application is installed in the apparatus, and wherein the PID is assigned to the first application when the first application is executed in the apparatus; and when the first function is determined to be restricted for the first application, control the display to display a first message indicating that the first function is restricted, and wherein the controller is configured to store the restriction information to correspond to the first application when requested to restrict the at least one function for the first application.

2. The apparatus of claim 1, wherein the controller is configured to control the display to display a name of the first function together with the first message.

3. The apparatus of claim 1, wherein the controller is configured to:

identify the user ID and the process ID;

search for process information that includes information about a currently executing process in the apparatus;

search for application information using the process information and the process ID;

identify a package name of the first application using the application information and the user ID;

identify the restriction information that corresponds to the package name; and determine whether the first function is permitted for the first application based on the identified restriction information.

4. The apparatus of claim 1, wherein the controller is configured to, when requested to execute the specific first application, determine whether the first function corresponds to the at least one function restricted for the first application by using the restriction information corresponding to the first application, and when the first function corresponds to the at least one function restricted for the first application, display the first message indicating that the first function is restricted.

5. The apparatus of claim 4, wherein the controller is configured to display the first message with a window asking whether to continue or stop executing the first application.

6. The apparatus of claim 1, wherein the first function comprises at least one of personal information and network communication.

7. A method of controlling an application in an apparatus, the method comprising:

when requested for an invocation of a first function provided by a framework of an operating system during an execution of a first application, identify restriction information for at least one function restricted for the first application using a user ID and process ID (PID) of the first application, determine whether the first function is permitted for the first application based on the identified restriction information, wherein the user ID is assigned to the first application when the first application is installed in the apparatus, and wherein the PID is assigned to the first application when the first application is executed in the apparatus;

when the first function is determined to be restricted for the first application, control the display to display a first message indicating that the first function is restricted; and storing the restriction information to correspond to the first application when requested to restrict the at least one function for the first application.

8. The method of claim 7, wherein the displaying of the first message comprises displaying a name of the first function together with the first message.

9. The method of claim 8, wherein the determining of whether the permission is obtained comprises:

identifying the user ID and the process ID;

searching for process information including information about a currently executing process in the apparatus;

searching for application information using the process information and the process ID;

identifying a package name of the first application using the application information and the user ID;

identifying the restriction information that corresponds to the package name of the first application; and determining whether the first function is permitted for the first application based on the identified restriction information.

10. The method of claim 8, further comprising: when requested to execute the first application, determining whether the first function corresponds to the at least one function restricted for the first application by using the restriction information corresponding to the first application; and when the first function corresponds to the at least one function restricted for the first application, displaying the first message indicating that the first function is restricted.

11. The method of claim 9, wherein the displaying of the second message comprises displaying the first message with a window asking whether to continue or stop executing the first application.

12. The method of claim 7, wherein the specific first function comprises at least one of personal information and network communication.

13. Code implemented on a non-transitory, computer-readable medium, when executed by a processor of an apparatus, configured to perform at least the following:

when requested for an invocation of a first function provided by a framework of an operating system during an execution of a first application, identify restriction information for at least one function restricted for the first application using a user ID and process ID (PID) of the first application, determine whether the first function is permitted for the first application based on the identified restriction information, wherein the user ID is assigned to the first application when the first application is installed in the apparatus, and wherein the PID is assigned to the first application when the first application is executed in the apparatus;

when the first function is determined to be restricted for the first application, control the display to display a first message indicating that the first function is restricted store the restriction information to correspond to the first application when requested to restrict the at least one function for the first application.

14. The code of claim 13, further configured to display a name of the first function together with the first message.

15. The code of claim 13, further configured to:

identify the user ID and the process ID;

search for process information that includes information about a currently executing process in the apparatus;

search for application information using the process information and the process ID;

identify a package name of the first application using the application information and the user ID;
identify the restriction information that corresponds to the package name; and
determine whether the first function is permitted for the first application based on the identified restriction information.

16. The code of claim 13, further configured to, when requested to execute the first application, determine whether the first function corresponds to the at least one function restricted for the first application by using the restriction information corresponding to the first application, and when the first function corresponds to the at least one function restricted for the first application, display the first message indicating that the first function is restricted.

17. The code of claim 16, further configured to display the first message with a window asking whether to continue or stop executing the first application.

* * * * *